Feb. 14, 1950 G. BONNETT 2,497,757
APPARATUS FOR MOLDING INSULATION
ABOUT A CABLE SPLICE
Filed Jan. 17, 1946 3 Sheets-Sheet 1

INVENTOR
G. BONNETT
BY
ATTORNEY

Patented Feb. 14, 1950

2,497,757

UNITED STATES PATENT OFFICE 2,497,757

APPARATUS FOR MOLDING INSULATION ABOUT A CABLE SPLICE

Gerson Bonnett, Baltimore, Md., assignor to Western Electric Company, Incorporated, New York, N. Y., a corporation of New York Application January 17, 1946, Serial No. 641,847

7 Claims. (Cl. 18—36)

This invention relates to molding apparatus, and more particularly to apparatus for molding insulation over a plurality of splices of a plurality of conductors of a cable.

In the manufacture of long lengths of multi-conductor cables, a number of lengths of the cables are sometimes spliced together to form long lengths thereof. In splicing lengths of such a cable together, insulating covers on conductive cores of insulated conductors of the lengths are removed from the ends of conductive cores thereof and the ends of the conductive cores of one of the lengths of the cable are brazed to the ends of the conductive cores of the other length of the cable. Insulating material then is formed over each of the brazed portions of the conductive cores to insulate them.

In the past, either the insulating material has been placed over and vulcanized on the brazed portions of the conductive cores one at a time, or the several brazed portions of the conductive cores have been placed in several molding cavities of a mold in which the molding cavities are spaced in a single plane. If the insulating material is vulcanized on the several brazed portions of the conductive cores one at a time, the molding operation is time-consuming and costly, and it is difficult to obtain uniformly molded covers on each of several conductive cores of the two lengths of the cables. If molding apparatus having molding cavities lying in the same plane is used to mold covers over several brazed portions of conductive cores of the cable, some of the conductive cores are spread out further than are others of the conductive cores so that the first-mentioned conductive cores are under higher tension than are the other conductive cores. This causes non-uniformity in covers molded over the brazed portions of the conductive cores of cable.

An object of the invention is to provide new and improved molding apparatus.

Another object of the invention is to provide new and improved apparatus for molding simultaneously coverings of insulating material over a plurality of brazed conductive cores of lengths of a cable, while all of the conductive cores are held under an equal tension.

In accordance with these and other objects, there is provided a molding apparatus including a mold which has a pair of separable mold sections having a plurality of molding cavities formed therein. Some of the molding cavities are spaced below the other molding cavities and one of the mold sections is provided with a main extrusion chamber and an auxiliary extrusion chamber. A main extrusion plunger and an auxiliary extrusion plunger extrude insulating material into the molding cavities from opposite sides thereof to fill the cavities with the insulating material. A removable loading fixture serves to tension equally a plurality of conductors of a cable and to position them in proper relationships with respect to the mold.

A complete understanding of the invention may be obtained from the following detailed description of a molding apparatus forming a specific embodiment thereof, when read in conjunction with the appended drawings, in which.

Figure 1:
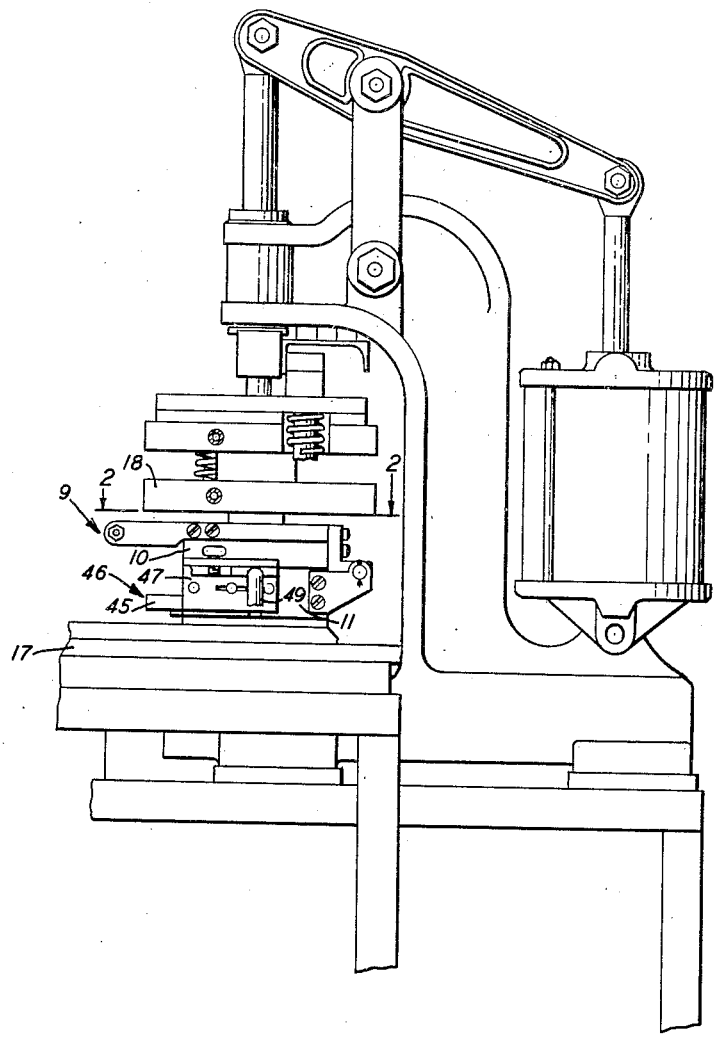
Fig. 1 is a side elevation of a molding apparatus forming one embodiment of the invention.
Figure 2:
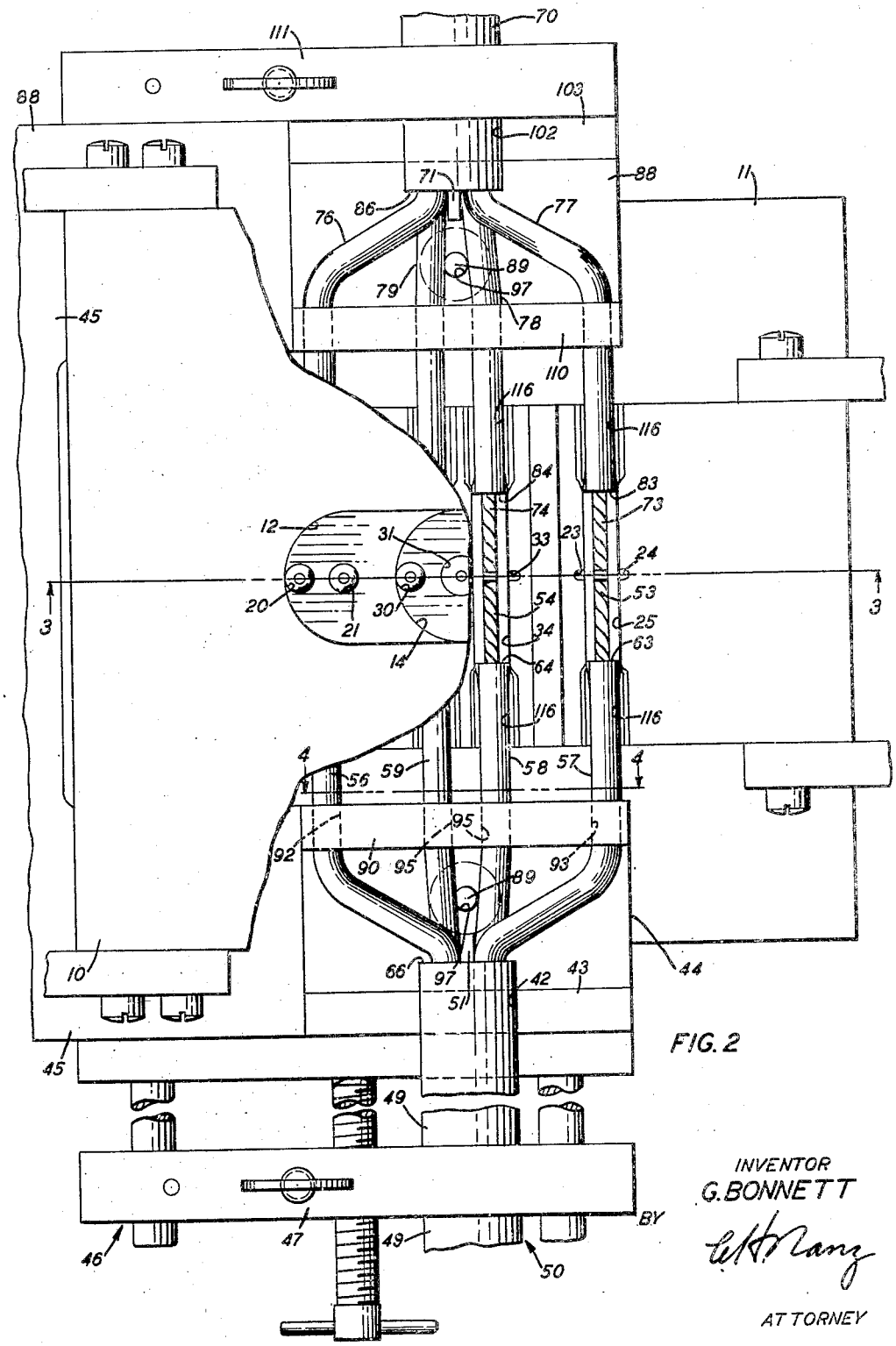
Fig. 2 is a fragmentary, horizontal section taken along line 2—2 of Fig. 1.
Figure 3:
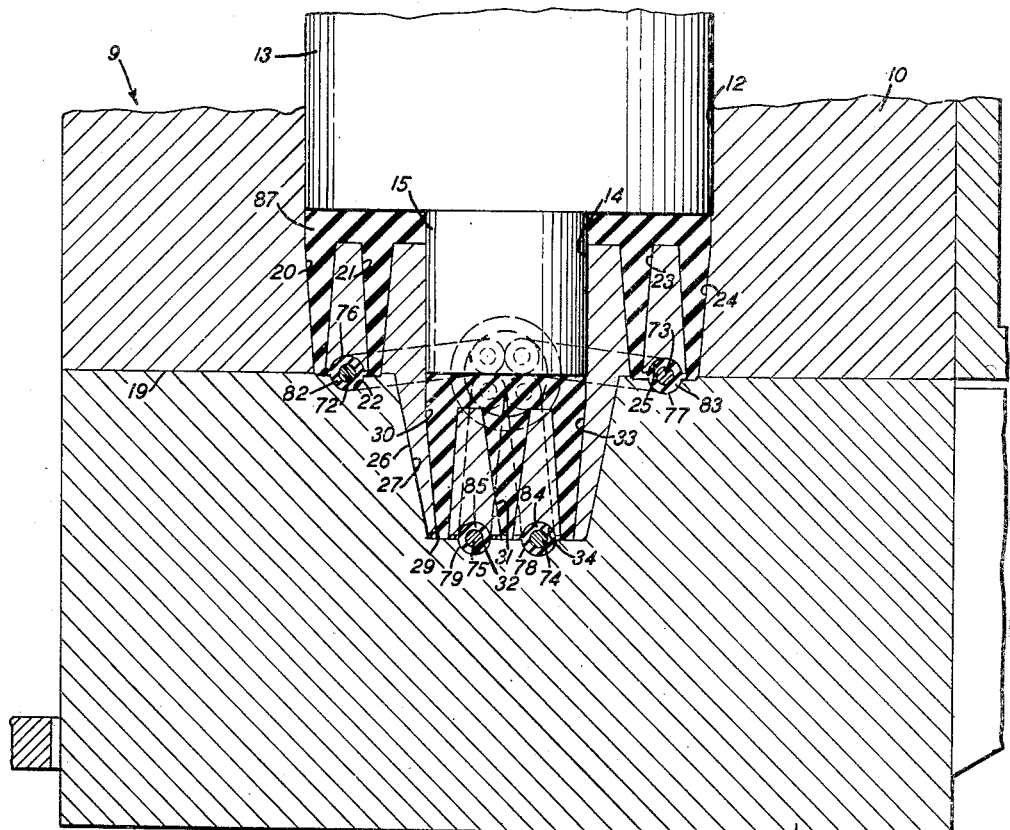
Fig. 3 is a fragmentary, vertical section taken along line 3—3 of Fig. 2.

Referring now in detail to the drawings, there is shown therein a molding apparatus including a molding press and a mold 9 having an upper mold section 10 (Figs. 1 and 2) and a lower mold section 11. The upper mold section has formed therein a main extrusion chamber 12, in which a main plunger 13 (Fig. 3) of the molding press may enter, and also is provided with an auxiliary extrusion chamber 14 formed in the central portion of the main extrusion chamber 12 and into which an auxiliary plunger 15 formed on the end of the main plunger 13 is designed to enter. The molding press includes a heated stationary platen 17 (Fig. 1) and a heated stripper platen 18. Sprues 20 and 21 (Fig. 3) lead from the main extrusion chamber 12 and have outlets directed from opposite sides of and toward the centerline of an elongated molding cavity 22 formed in the mold sections 10 and 11 along a main junction plane 19 thereof. Sprues 23 and 24 leading from the main extrusion chamber have outlets directed from opposite sides of and toward the centerline of an elongated molding cavity 25 at the main junction plane of the mold sections.

The upper mold section 10 has a tapered rib 26 formed thereon, which fits into a complementary tapered groove 27 formed in the lower mold section 11, and is pivotally connected to the lower mold section by a pintle 28. The tapered rib 26 and the tapered groove 27 serve to align the mold sections. Sprues 30 and 31 formed in the tapered rib 26 have outlets directed toward the centerline of an elongated molding cavity 32 formed in the mold sections 10 and 11 along an auxiliary junction plane 29 from opposite sides of the cavity 32, and the sprue 31 and a sprue 33 have outlets directed toward the centerline of an elongated molding cavity 34 from opposite sides thereof.

Figure 4:
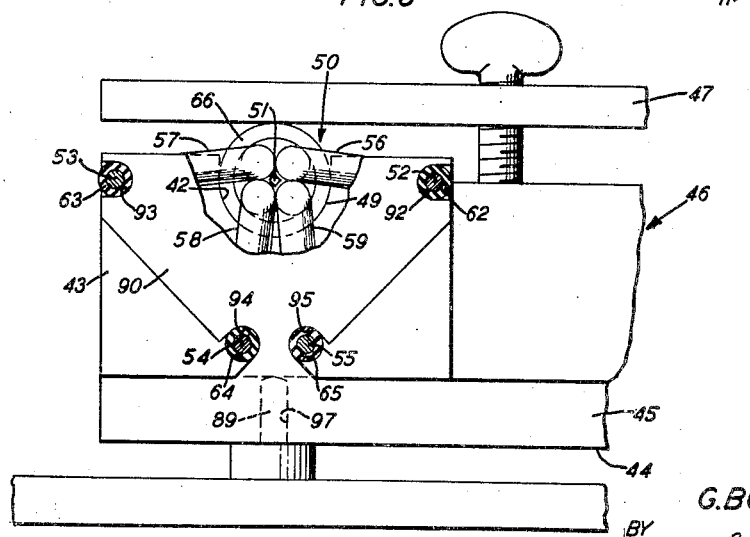
Fig. 4 is a fragmentary, vertical section taken along line 4—4 of Fig. 2.

A groove 42 (Figs. 2 and 4) formed in a block 43, which is mounted on an arm 44 of a U-shaped frame 45 of a loading fixture 46 serves to receive and an adjustable clamp 47 carried by the arm serves to clamp a length 49 of a cable 50 in a position in which the axis of this length of the cable lies in the main junction plane 19 of the mold sections 10 and 11. The length 49 of the cable 50 includes a filler cord 51 and conductive cores 52, 53, 54 and 55 of insulated conductors 56, 57, 58 and 59, respectively, and over which insulating covers 62, 63, 64 and 65, respectively, are positioned. The end portion of a jacket 66 of the length 50 of the cable has been removed from the ends of the insulated conductors 56, 57, 58 and 59 so that the ends of these insulated conductors are bared. The ends of the insulating covers 62, 63, 64 and 65 are removed from the ends of the conductive cores 52, 53, 54 and 55, respectively.

A length 70 of the cable 50 (Figs. 2 and 3) identical with the length 49 includes a filler cord 71 and conductive cores 72, 73, 74 and 75 of insulated conductors 76, 77, 78 and 79, respectively, over which conductive cores insulating covers 82, 83, 84 and 85, respectively, are formed. The end of a jacket 86 of the length 70 of the cable is removed to bare the insulated conductors 76, 77, 78 and 79, and short lengths of the insulating covers 82, 83, 84 and 85 are removed from the ends of the conductive cores 72, 73, 74 and 75, respectively. The ends of the conductive cores 52, 53, 54 and 55 are brazed to the ends of the conductive cores 72, 73, 74 and 75, respectively. Equal lengths of the spliced conductors 56 and 76, 57 and 77, 58 and 78, and 59 and 79 are between the end of the jacket 66 of the length 49 of cable 50 and the end of the jacket 86 of the length 70 of the cable so that after the bared portions of the conductive cores are covered with insulating material 87 (Fig. 3), as described hereinafter, and a jacketing compound is formed over the spliced portion of the cable, each of the spliced pairs of the insulated conductors will be placed under an equal tension when the spliced portion of the cable is tensioned.

A locating spreader 90 of the loading fixture 46 has semi-circular notches 92, 93, 94 and 95 formed therein and is mounted on the arm 44 of the frame 45 between the block 43 and the molding cavities 22, 25, 32 and 34. The U-shaped frame 45 has a second arm 88, and the arms 44 and 88 are provided with bores 97—97 which fit closely over liner pins 89—89 projecting from the lower mold section 11 to align the semi-circular notches 92, 93, 94 and 95 with the elongated molding cavities 25, 22, 32 and 34, respectively. These semi-circular notches are designed to receive and hold the insulated conductors 56, 57, 58 and 59, respectively, therein. The axis of the groove 42 in the block 43 is equidistant from each of the notches 92 and 93 in the spreader 90, and also is equidistant from the notches 94 and 95 in the spreader 90. The notches 92, 93, 94 and 95 in the spreader 90 are so located with respect to the length 49 of the cable 50 in the groove 42 in the block 43 that the lengths of the conductive cores 52, 53, 54 and 55 between the end of the jacket 66 and the spreader 90 are equal.

The loading fixture 46 also includes a block 103 (Fig. 2) having a groove 102 and a locating spreader 110, which are identical with the block 43 and the locating spreader 90, respectively, and are mounted on the arm 88 of the U-shaped frame 45. The block 93 and the locating spreader 110 position the length 70 of the cable 50 and the insulated conductors thereof in the same manner that the block 43 and the locating spreader 90 position the insulated conductors of the length 49 of the cable 50. Hence, the total length of the conductive cores 72 and 52 between the end of the jacket 66 and the end of the jacket 86 are equal to each of the lengths of the spliced conductive cores 52 and 72, 53 and 73, 54 and 74, and 55 and 75. A stationary clamp 111 serves to clamp the length 70 of the cable 50 and the adjustable clamp 47 may be actuated to tension these conductive cores in the loading fixture between it and the clamp 111 and the tensions placed upon each of these spliced conductive cores in the mold sections 10 and 11 are equal because the lengths of the paths they follow between the clamps 47 and 111 are equal. Thus, when the insulating material 87 is extruded into the elongated molding cavities 22, 25, 32 and 34, the coverings formed thereby will be uniform in thickness.

In the operation of the molding apparatus described hereinabove, the lengths 49 and 70 of the cable 50 are positioned, clamped, and tensioned in loading fixture 46, as described hereinabove. The loading fixture mounting the cable 50 then is positioned on the mold section 11 and is oriented with respect thereto by the liner pins 89—89. At this time, the portions of the insulated conductors 56, 57, 58, 59, 76, 77, 78 and 79 fit tightly in the lower halves of grooves 116—116 formed in the mold sections 10 and 11 at the ends of the molding cavities 22, 25, 32 and 34. The spliced conductive cores 53 and 73 lie in the elongated mold cavity 25, the spliced conductive cores 52 and 72 lie in the elongated molding cavity 22, the spliced conductive cores 54 and 74 lie in the elongated molding cavity 32, and the spliced conductive cores 55 and 75 lie in the elongated molding cavity 34. At this time the conductive cores 52, 53, 54, 55, 72, 73, 74 and 75 are under equal tensions.

The upper mold section 10 then is closed on the lower mold section 11 and the insulating material 87 is placed in the main extrusion chamber 12 and the auxiliary extrusion chamber 14. The assembled mold sections 10 and 11 then are placed between the heated lower platen 17 and the heated stripper platen 18 of the molding press, and the stripper platen 18, the main plunger 13 and the auxiliary plunger 15 are moved downwardly. The heated stripper platen engages the upper mold section 10 and presses it tightly against the lower mold section 11, and the main plunger 13 and the auxiliary plunger 15 then are forced by the press into the main extrusion chamber 12 and the extrusion auxiliary chamber 14, respectively. This forces the insulating material 87 through the several sprues into the molding cavities 22, 25, 32 and 34 until they are filled with the molding material. The flow of the insulating material 87 through the molding cavities is from directly opposite sides thereof so that the conductive cores positioned in the molding cavities are held in centered positions therein by the balanced flow of the insulating material.

The mold sections 10 and 11 are heated by the heated platens 17 and 18 and this heat vulcanizes the insulating material 87 molded around the spliced portions of the conductive cores. After this vulcanization is completed, the plungers 13 and 15 are withdrawn from the extrusion chambers 12 and 14, respectively, and the stripper platen 18 then is lifted from the upper mold section 10. The mold 9 is moved out of the press and the upper mold section 10 is swung to an open position. The loading fixture 46 is removed from the mold sections with the lengths 49 and 70 of the cable 50, and a second loading fixture (not shown), which is identical with the loading fixture 46 and has been loaded with a second cable during the last-described molding operation, then is placed in the mold 9, which is closed thereon and is reinserted into the press.

The above-described operation then may be repeated to mold insulating coverings over spliced portions of conductive cores of the second cable. Meanwhile, the cable 50 is removed from the loading fixture 46 and another cable is clamped therein so that the loading fixture 46 may be substituted in the mold 9 immediately after the end of the contemporaneous molding operation so that the next molding operation may be started without waiting to unload and reload that loading fixture.

The above-described molding apparatus serves to accurately position conductive cores in molding cavities and holds the conductive cores in positions in which equal tensions are placed on the conductive cores so that insulating coverings molded over conductive cores are uniform in thickness and quality.

The molding apparatus is simple in construction and is highly effective in its operation. It molds insulating material over several spliced portions of conductive cores simultaneously with a consequent saving in labor, time and equipment. The fact that one loading fixture may be unloaded and reloaded during a molding operation on a cable held by a second loading fixture increases the production of the molding press per unit of time since the press is idle only during the short intervals in which one of the loading fixtures is substituted for the other. This also prevents the mold 9 from cooling off so that it does not have to be reheated for each molding operation, which fact shortens the time required for each molding operation. The loading fixtures themselves cool somewhat as they are unloaded and reloaded but they need not be heated to further the molding operations and their mass is small relative to that of the mold so that the amount of heat they drain from the mold is negligible.

The above-described apparatus may be adapted to mold coverings over cables having more or less conductors than the cable 50. Also, the disposition of the molding cavities 22, 25, 32 and 34 may be modified, and the positions of the notches in the spreaders 90 and 110 may be varied accordingly to maintain the conductive cores of a cable under equal tensions by making the paths thereof equal.

What is claimed is:

1. A molding apparatus, which comprises a mold having formed therein several spaced, parallel molding cavities and a spreader having notches formed therein positioned transversely of the molding cavities for holding the conductive cores of a cable extending beyond an end of a jacket of the cable in spaced positions in the notches therein which are in alignment with the spaced molding cavities, the ends of said molding cavities and the spreader being so spaced with respect to the cable that the end of the jacket of the lengths of each of the portions of the conductive cores of the cable between the end of the jacket of the cable and the ends of the molding cavities are substantially equal.

2. A molding apparatus, which comprises a mold having formed therein several parallel, elongated molding cavities, some of said molding cavities lying in one plane and at least one of said molding cavities lying in a second plane, the ends of the molding cavities being flush, a spreader having notches therein positioned near the ends of the molding cavities and positioned transversely with respect to the longitudinal axes of the molding cavities for holding conductive cores of a cable extending beyond the end of a jacket of the cable in spaced positions in the notches which are in alignment with the molding cavities in the mold, and means positioned on the side of the spreader away from the molding cavities for holding the jacketed portion of the cable in a position in which the lengths of the portions of the conductive cores between the spreader and a plane at the end of the jacketed portion of the cable transverse to the cable are substantially equal.

3. A molding apparatus, which comprises a pair of complementary mold sections having a pair of offset meeting surfaces, said mold sections having a pair of parallel, elongated molding cavities extending along one of the meeting surfaces of the mold sections and also being provided with another elongated molding cavity extending along the other meeting surface parallel to the first-mentioned molding cavities, one of said mold sections being provided with an extrusion chamber and sprues for connecting the extrusion chamber to the molding cavities in the mold sections, a pair of blocks having grooves formed therein and mounted in positions in which the grooves are aligned with each other for supporting therein a pair of lengths of a cable having a plurality of spliced conductive cores, and a pair of spreaders for guiding conductive cores of a pair of lengths of a cable supported by the blocks into alignment with the molding cavities in the mold sections.

4. A molding apparatus, which comprises a pair of complementary mold sections having a pair of offset junction planes, said mold sections having a pair of parallel, elongated molding cavities extending along one of the junction planes of the mold sections and also being provided with another elongated molding cavity extending along the other junction plane parallel to the first-mentioned molding cavities, an end of each of said molding cavities lying in a single plane transverse to the axes of the molding cavities, the other end of each of the molding cavities in the mold sections lying in a second plane transverse to the axes of the molding cavities, one of said mold sections being provided with a main extrusion chamber and sprues for connecting the extrusion chamber to the first-mentioned molding cavities in the mold sections, said last-mentioned mold section also being provided with an auxiliary extrusion chamber and a plurality of sprues for connecting that extrusion chamber to the second-mentioned molding cavity in the mold sections, and a pair of cable-holding means positioned at opposite ends of the molding cavities in the mold sections for clamping under tension a pair of lengths of a cable of which each length has one of a plurality of conductive cores thereof spliced to one of a plurality of conductive cores of the other length and for holding the conductors of the cables in alignment with the molding cavities in the mold sections.

5. In a molding apparatus including a pair of separable mold sections having a plurality of elongated molding cavities extending therethrough and a pair of liner pins, a loading fixture comprising a frame having a pair of arms and removable from the mold sections, said frame also being provided with a pair of bores for fitting closely over the liner pins to locate the arms in predetermined positions at opposite ends of the mold sections, a pair of clamps carried by the arms of the frame at opposite ends of the mold sections, and a pair of spreaders having notches therein mounted on the arms of the frame in positions between the clamps and the ends of the mold sections.

6. A molding apparatus, which comprises a lower mold section including a horizontal base portion and a central portion raised from the base portion and provided with a plurality of elongated molding recesses, said base portion of the lower mold section being provided with a pair of liner pins, an upper mold section having formed therein a plurality of molding recesses complementary to the molding recesses in the central portion of the lower mold section for forming a plurality of molding cavities therewith, and a loading fixture including a generally U-shaped frame having formed therein a pair of bores for fitting closely over the liner pins to locate the frame in a position in which it extends partially around the central portion of the lower mold section and removable from the liner pins, a pair of clamps carried by the frame in positions at opposite ends of the molding cavities formed in the mold sections for clamping a cable in a position extending therebetween, and a pair of spreaders having notches therein carried by the frame between the ends of the molding cavities and the clamps for guiding into alignment with the molding cavities a plurality of conductors of a cable clamped by the clamps.

7. A molding apparatus, which comprises a pair of mold sections having a plurality of parallel, elongated molding cavities positioned in a plurality of predetermined planes, a plurality of liner pins located outside of the mold sections and in predetermined positions with respect to the molding cavities in the mold sections, a frame of the general shape of a U having a pair of arms and also provided with a plurality of bores for fitting closely over the liner pins, said bores in the frame being located in positions in which the arms of the frame are positioned at opposite ends of the mold sections, a stationary clamp mounted on one of the arms of the frame in a position in which it is equidistant from the ends adjacent thereto of the molding cavities in the mold sections for clamping a cable having a plurality of conductors, an adjustable clamp mounted on the other arm of the frame in alignment with the stationary clamp for clamping and tensioning a cable clamped by the stationary clamp, a pair of spreaders having a plurality of conductor-receiving notches formed therein and mounted on the arms of the frame in positions in which they are positioned between the clamps and the molding cavities and in which the notches therein are aligned with the molding cavities for guiding a plurality of conductors of the cable into alignment with the molding cavities, and a pair of guide blocks positioned between the clamps and the spreaders for locating the cable with respect to the spreaders.

GERSON BONNETT.

REFERENCES CITED

The following references are of record in the file of this patent:

UNITED STATES PATENTS

| Number | Name | Date |
|---|---|---|
| 215,231 | Manly | May 13, 1879 |
| 1,153,126 | Long | Sept. 7, 1915 |
| 1,782,447 | Scrantom | Nov. 25, 1930 |
| 1,789,469 | Knaus | Jan. 20, 1931 |
| 1,883,736 | Cotterman | Oct. 18, 1932 |
| 2,186,160 | Anderson | Jan. 9, 1940 |
| 2,203,787 | Husted | June 11, 1940 |
| 2,254,233 | Meyer | Sept. 2, 1941 |

FOREIGN PATENTS

| Number | Country | Date |
|---|---|---|
| 406,849 | Great Britain | Mar. 8, 1934 |
| 793,589 | France | Jan. 27, 1936 |

Certificate of Correction

February 14, 1950

Patent No. 2,497,757  GERSON BONNETT

It is hereby certified that error appears in the printed specification of the above numbered patent requiring correction as follows:

Column 5, line 73, strike out the words "the cable that"; same line, before "lengths" insert *cable that the*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*